United States Patent [19]

Echtler et al.

[11] Patent Number: 5,097,184
[45] Date of Patent: Mar. 17, 1992

[54] BATTERY OPERATED DEVICE

[75] Inventors: Karl Echtler, Puchheim; Hanno Richter, Unterhaching; Wolfgang Millauer, Munich, all of Fed. Rep. of Germany

[73] Assignee: Hilti Aktiengesellschaft

[21] Appl. No.: 674,568

[22] Filed: Mar. 25, 1991

[30] Foreign Application Priority Data

Mar. 23, 1990 [DE] Fed. Rep. of Germany ....... 4009402

[51] Int. Cl.$^5$ ............................................. H02P 5/00
[52] U.S. Cl. ................................. 318/139; 318/109; 388/838
[58] Field of Search .......... 318/139, 268, 66, 105–106, 318/109, 440; 388/839, 838, 825–827

[56] References Cited

U.S. PATENT DOCUMENTS

| 635,139 | 10/1899 | Kubierschky | 318/139 |
|---|---|---|---|
| 2,387,262 | 10/1945 | Hubbard | 323/255 |
| 3,336,516 | 8/1967 | Kelley | 318/139 |
| 3,984,744 | 10/1976 | Moody | 318/139 |
| 4,260,938 | 4/1981 | Joyes | 318/434 |
| 4,296,363 | 10/1981 | Blake et al. | 318/139 X |
| 4,406,982 | 9/1983 | McClellan | 388/839 |
| 4,465,958 | 9/1984 | Roberts | 388/839 |
| 4,639,646 | 1/1987 | Harris et al. | 318/139 |
| 4,788,480 | 11/1988 | Field et al. | 318/139 X |
| 4,875,539 | 10/1989 | Abukawa et al. | 318/139 X |

Primary Examiner—William M. Shoop, Jr.
Assistant Examiner—David Martin
Attorney, Agent, or Firm—Toren, McGeady & Associates

[57] ABSTRACT

A battery operated device includes a circuit connecting a DC motor (22) and a battery (9) made up of a plurality of cells (10, 11, 12) connected in series with a two-pole switch device (23) including a first switch (24) and a second switch (25). The DC motor (22) receives a lower battery voltage from an intermediate tap (17) of the battery through a first switch (24) and it receives the full battery voltage through an end tap (15) when the second switch (25) is closed so that the motor can be operated at two speeds. Further, elements are provided for preventing a short circuit between the intermediate tap (17) and the end tap (15) of the battery (9) when the second switch (25) is closed. As a result of this switching arrangement, an extensively interrupted-switching is available, so that practically no power lapses occur when switching over from one speed to the other.

22 Claims, 3 Drawing Sheets

BATTERY OPERATED DEVICE

BACKGROUND OF THE INVENTION

The present invention is directed to a battery operated device in which a DC motor is powered by a battery formed by a plurality of cells arranged in series. A switch device is located between the battery and the DC motor whereby, initially, a lower battery voltage is supplied to the DC motor via an intermediate tap of the battery and, subsequently, a full battery voltage is supplied via an end tap of the battery so that the rotational speed of the motor can be changed.

A battery operated device of the above type is disclosed in GB-PS 1,395,508. This known device, illustrated in FIG. 1 in more detail, includes a battery 2 made up of a plurality of cells I connected in series and supplied with power via a bridge circuit 3 and connected, via plugs 4, 5, with the secondary side of a mains or distribution transformer 6. A DC motor 8 is connected with the battery 2 by a switch device 7, whereby first a lower battery voltage is supplied from an intermediate tap 7a of the battery, and then a full battery voltage is supplied by an end tap 7b of the battery to the DC motor 8 by the switch device 7 for changing the rotational speed of the DC motor 8.

In switching the rotational speed, however, there is the danger that a short circuit may occur between the intermediate tap and the end tap as a result of an extended arc, particularly in the case of a DC motor with high output. In such a situation, a power lapse would occur, which is unacceptable, especially in manually operated tools.

A power lapse also results when the respective circuits are interrupted as speeds are changed due to switch adjustment.

SUMMARY OF THE INVENTION

A primary object of the present invention is to provide an improvement of the known battery operated device whereby power lapses due to short circuits or circuit interruptions are avoided to a great extent.

In accordance with the present invention, a two-pole switch device is provided between the battery and the DC motor including a first switch for transmitting lower battery voltage and a second switch for supplying full battery voltage to the motor. The first switch is arranged so that it remains in the closed position at least over a long switch path and the closing of the second switch lags behind the closing of the first switch. In addition, means are provided for preventing a short circuit between the intermediate tap and the end tap of the battery when the second switch is closed. Advantageous features of the invention are set forth in the claims.

The battery operated device embodying the present invention can be divided into an operating part which contains at least the DC motor and the switch device, and into a power source containing at least the battery with both parts electrically connected together. The operating part can be a portable drilling machine or another electrically operated tool.

In a drilling machine two fixed speeds can be provided, such as a low speed for spot drilling operation and a high speed for main drilling operation following the spot drilling operation. A two-pole switch device includes a trigger for closing the first and second switches used for changing between the two above mentioned speeds. By slightly pressing the trigger, initially the first switch is closed whereby the lower battery voltage is directed to the DC motor from the intermediate tap directly via the first switch. When the trigger is pressed further, the second switch is closed at a later point in time and then directly or indirectly the full battery voltage is supplied to the DC motor and such voltage is obtained from the end tap of the battery. The full battery voltage can be applied to the DC motor by way of the first switch or directly by way of the second switch, depending on the arrangement of the circuit. In both cases, the first switch, after closing, must remain closed over the entire remaining switching path until the second switch closes so that a circuit interruption does not occur which would lead to a power lapse. It is also possible to keep the first switch closed until shortly before the second switch is closed, wherein the second switch closes suddenly after the opening of the first switch, whereby there is practically no substantial power lapse. In this later case, the full battery voltage is fed to the DC motor directly via the second switch.

To prevent a short circuit between the intermediate tap and the end tap of the battery when closing the second switch, a diode device is arranged in a branch line extending between the intermediate tap of the battery and the first switch which, after closing, remains closed along the entire switch path. Corresponding to its polarity, the diode device allows a current flow through the DC motor when the first switch is closed, however, the diode device is located between the intermediate tap and the end tap of the battery when the second switch is closed and, as a result, is blocked by the differential voltage between the intermediate tap and the end tap. A short circuit current of the type described above is prevented by the diode device, even if the second switch is closed when the first switch is still closed. Accordingly, a switching operation can be performed where there is neither a power lapse due to short circuiting nor a circuit interruption.

Another device can be used in place of the diode device for preventing a short circuit between the intermediate tap and the end tap of the battery when closing the second switch, such as a relay-controlled or electronic changeover switch. Such a changeover switch is switched over when the second switch is closed and, accordingly, supplies the lower battery voltage at one time and the full battery voltage at other times to the DC motor via the closed first switch.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
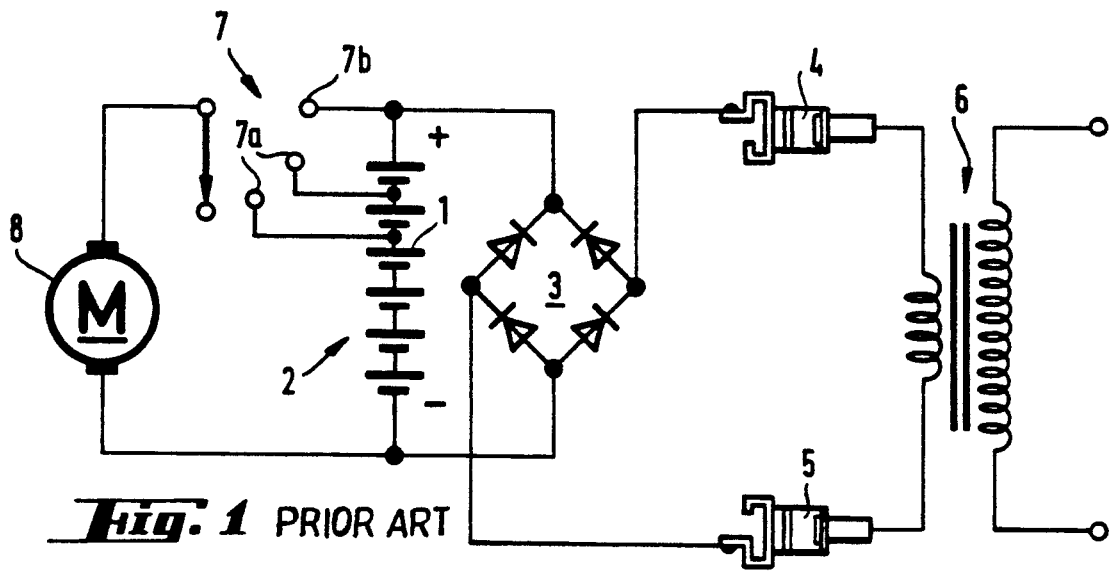
FIG. 1 is schematic view of a prior art battery operated device.

Different embodiments of the invention are described in more detail in the following with references to FIGS. 2 to 6, with identical parts provided with the same reference numerals.

Figure 2:
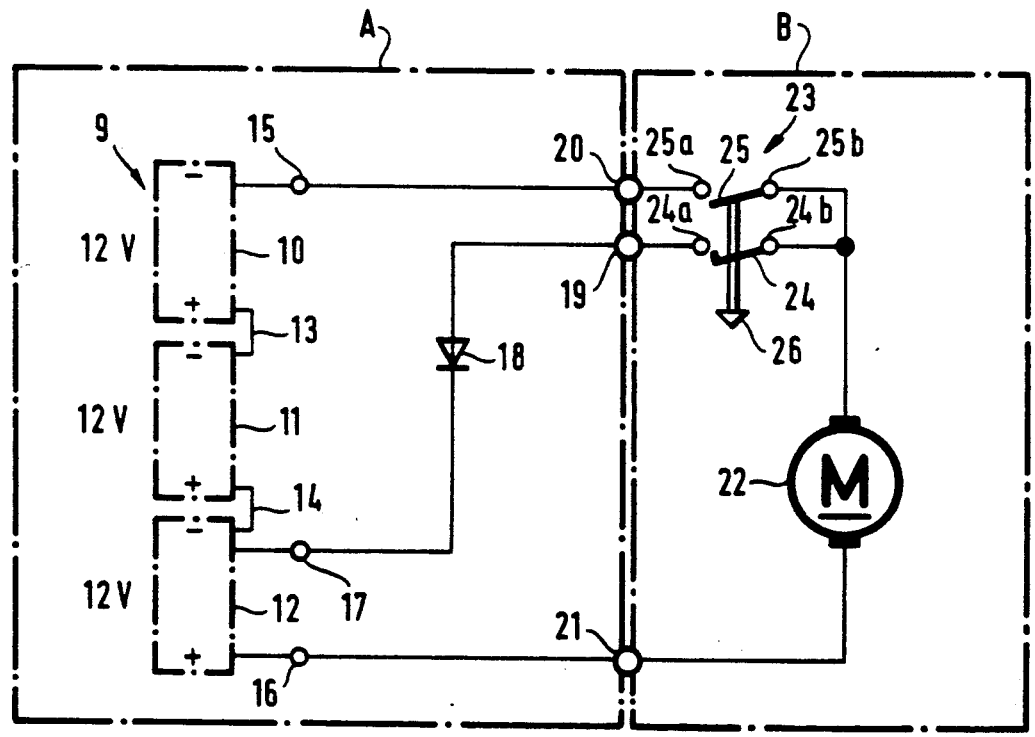
FIG. 2 is a schematic view of a battery operated device embodying the present invention with a diode device for preventing short circuiting.

In FIG. 2 a battery operated device is shown which is a first embodiment of the present invention. The battery operated device comprises an operating part A and another operating part B. The two operating parts are electrically connected with one another over a flexible or rigid line connection or circuit. They can also be plugged together so that the two operating parts A and B can be handled as a unit. In this first embodiment, operating part A is a storage battery and operating part B is a hand-held drilling machine. Battery 9 is made up of three cell groups 10, 11 and 12 connected in series and each supplying a voltage of 12 V and located in operating part A. Cell groups 10, 11 and 11, 12 are connected with one another over a line connection 13, 14, respectively, so that they delivery a total voltage of 36V between two end taps 15, 16. The negative pole is at the end tap 15 and the positive pole is at the end tap 16. Cell group 12 has an intermediate tap 17 to provide the lower operating voltage of 9.6 V.

More than three cell groups can be electrically connected in series to form a battery supplying higher battery voltage. Moreover, the intermediate tap can be provided at another location to produce a desired lower battery voltage. The individual cell groups comprise cells, so that the intermediate tap can be positioned between two adjacent cells.

In FIG. 2, the cathode of a diode 18, providing the diode device in this embodiment, is connected with the intermediate tap 17. The anode of the diode is connected with a connection plug 19. Other connection plugs 20, 21 are connected respectively with the end taps 15, 16. Operating part B includes a DC motor 22 and a two-pole switch device 23 with a first switch 24 and a second switch 25. The two switches are constructed as closing circuits. The switch device 23 is in the form of a pressure switch and includes a mechanically operated trigger 26. If the trigger is not pressed, the switches 24, 25 are in the open position. If the trigger 26 is pressed, initially, the first switch 24 closes and remains closed along the continued switch path until the second switch 25 closes.

The connection plug 20 is connected with a first contact connection 25a of the second switch 25, while the connection plug 19 is connected with a first contact connection 24a of the first switch 24. The second contact connections 24b, 25b of the first and second switches 24, 25 are connected with one another and with a connection of the DC motor 22 with the other motor connection connected with the connection plug 21.

The operation of the device illustrated in FIG. 2 will now be described in more detail. After connecting the operating parts A, B by means of the connection plugs 19, 20 and 21, in order to carry out a spot drilling operation when operating part B is a hand-held drilling machine, the trigger 26, a part of the drilling machine, is first pressed so that the first switch 24 is the first to close. Accordingly, a lower battery voltage is provided by means of the voltage differential between the intermediate tap 17 and the positive-polarized end tap 16 and is supplied to the DC motor 22. Accordingly, current flows from the positive-polarized end tap 16 through the connection plug 21, the DC motor 22, the closed switch 24, the diode 8 and the cell 12, whereby the DC motor 22 rotates relatively slowly.

If the trigger 26 is then pressed still further into the drilling machine, by the index finger, the second switch then closes, but without the first switch 24 opening. The DC motor now receives full battery voltage present between the end taps 15, 16 so that it rotates at a higher speed. A short circuit, however, does not develop between the end tap 15 and the intermediate tap 17 via the first and second switches 24, 25, since the polarity of the diode 18 is such that it is changed into the blocking state due to the voltage differential between the end tap and 15 and the intermediate tap 17.

Therefore, no power lapse occurs when switching the DC motor 22 from the lower speed to the higher speed, specifically neither due to a short circuit between the end tap 15 and the intermediate tap 17, nor as a result of a circuit interruption when actuating the switch device 23.

In the event the polarity of the battery 9 should be reversed, that is, with the positive pole at the end tap 15 and the negative pole at the end tap 16, the polarity of the diode 18, which can be a semiconductor diode, must be reversed in a corresponding manner.

Figure 3:
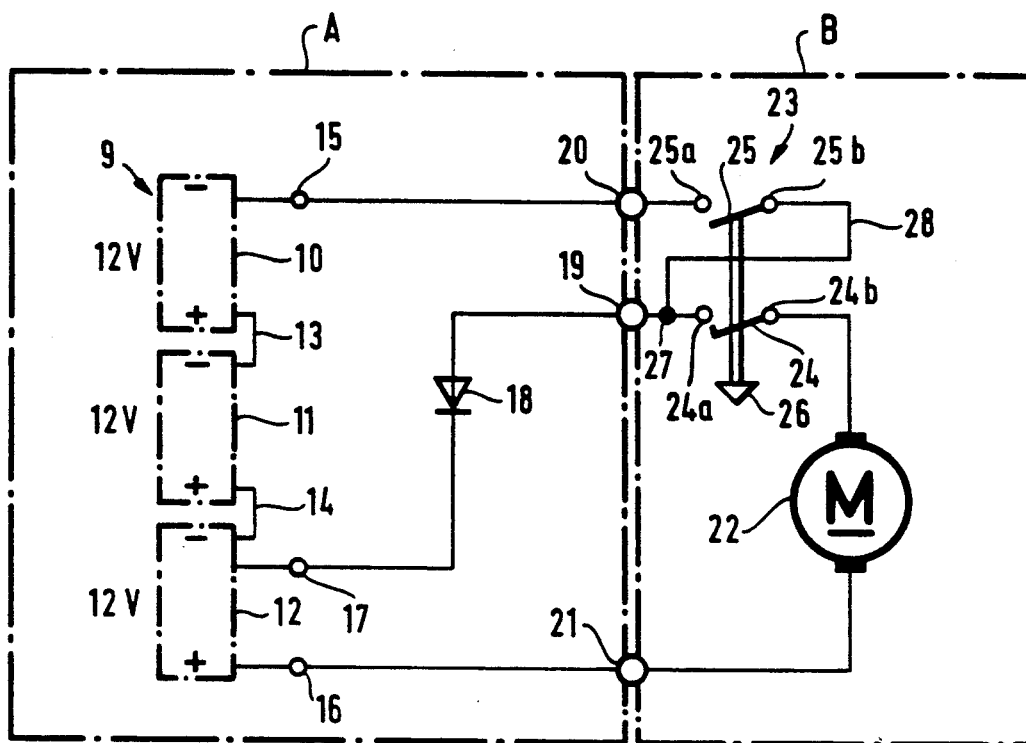
FIG. 3 is a schematic illustration of the device in FIG. 2, however, with the first and second switches of the switch device connected in series.

The embodiment in FIG. 3 is similar to that in FIG. 2, however, the two switches 24, 25 are connected in series. The second contact connection 25b of the second switch 25 is connected with the first contact connection 24a of the first switch, so that only the contact connection 24b of the first switch 24 is connected with the DC motor 22. If both switches 24, 25 are closed, the full battery voltage is supplied to the DC motor 22 via the two switches 24, 25.

The embodiment of FIG. 3 can be further modified so that the DC motor 22 lies in the circuit region directly in front of the first contact connection 24a of the first switch 24 instead of between the second contact connection 24b of the first switch and the connection plug 21. The DC motor 22 then lies between the diode 18 and the first contact connection 24a of the first switch and is located in a common line region of the two circuits, that is, between the first contact connection 24a and a junction 27 connected over a line 28 with the second contact connection 25b of the second switch 25.

Figure 4:
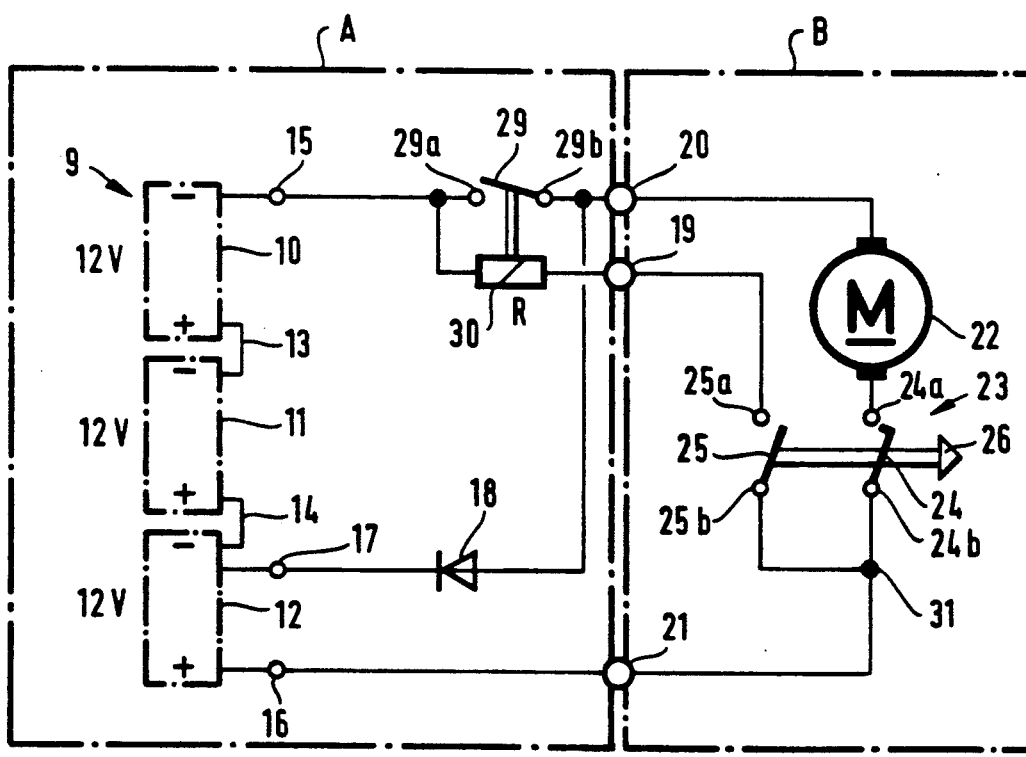
FIG. 4 is a schematic illustration of a battery operated device embodying the present invention with a diode device for preventing short circuiting and a switch device in which the lower battery voltage, as well as the full battery voltage, are transmitted via the first switch.

In the embodiment of FIG. 4, the lower battery voltage and the full battery voltage are supplied to the DC motor 22 exclusively by the first switch 24. In contrast to the above described embodiments, a relay switch 29 is located in the circuit between the end tap 15 and the connection plug 20. Relay switch 29 can be closed by a relay 30 when current flows through the relay. The relay 30 or R, respectively, is mechanically connected with the relay switch 29. More specifically, the end tap 15 of the battery 9 is connected with a first contact connection 25a of the second switch 25 via the relay 30 and the connection plug 19. The second contact connection 29b of the relay switch 29 is connected within the operating part A with the anode of the diode 18 and further via the connection plug 20 with a connection of the DC motor 22 which has its other connection connected to the first contact connection 24a of the first switch 24. The second contact connections 24b, 25b of the first and second switches 24, 25 are connected with one another and through the connection plug 21 with the battery end tap 16 which has positive polarity.

If the first switch 24 is initially closed by pressing the trigger 26, the DC motor 22 is supplied with lower battery voltage provided as a result of the voltage between the taps 16, 17. Accordingly, current flows from the positive polarity battery end tap 16 through the connection plug 21 and the first switch 24 to the motor and form the later back to the intermediate tap 17 through the connection plug 20 and the diode 18. As a result, the DC motor 22 rotates at low speed.

If the trigger 26 is pressed in further, the second switch is closed, while the first switch remains in the closed state. Accordingly, there is no circuit interruption at first. When the second switch 25 is closed, the relay 30 attracts and closes the relay switch 29. As mentioned above, no short circuiting is produced between the end tap 15 and the intermediate tap 17 due to the selected polarity of the diode 18, since the diode is changed into the blocking state as a result of the differential voltage between the end tap 15 and the intermediate tap 17. The DC motor 22 receives the full battery voltage by way of the relay switch 29 and the first switch 24 and, therefore, rotates at a higher speed.

When the trigger 26 is released, as in the embodiments described above, the second switch 25 opens first, whereby the DC motor 22 receives the lower battery voltage and rotates at the lower speed. The motor only ceases to rotate after the first switch 24 has been opened. Accordingly, both the starting and stopping of the DC motor takes place in two stages.

The switch 29 can be formed as a electronic switch, such as a transistor switch or a thyristor. The relay coil 30 is then realized by means of a control stage for driving the transistor switch or the thyristor when the second switch 25 closes.

In the embodiment of FIG. 4, it is also possible to arrange the DC motor 22 in the line between the connection plug 21 and a junction 31 with which the second contact connections 24b, 25b of the first and second switches 24, 25 are connected.

Figure 5:
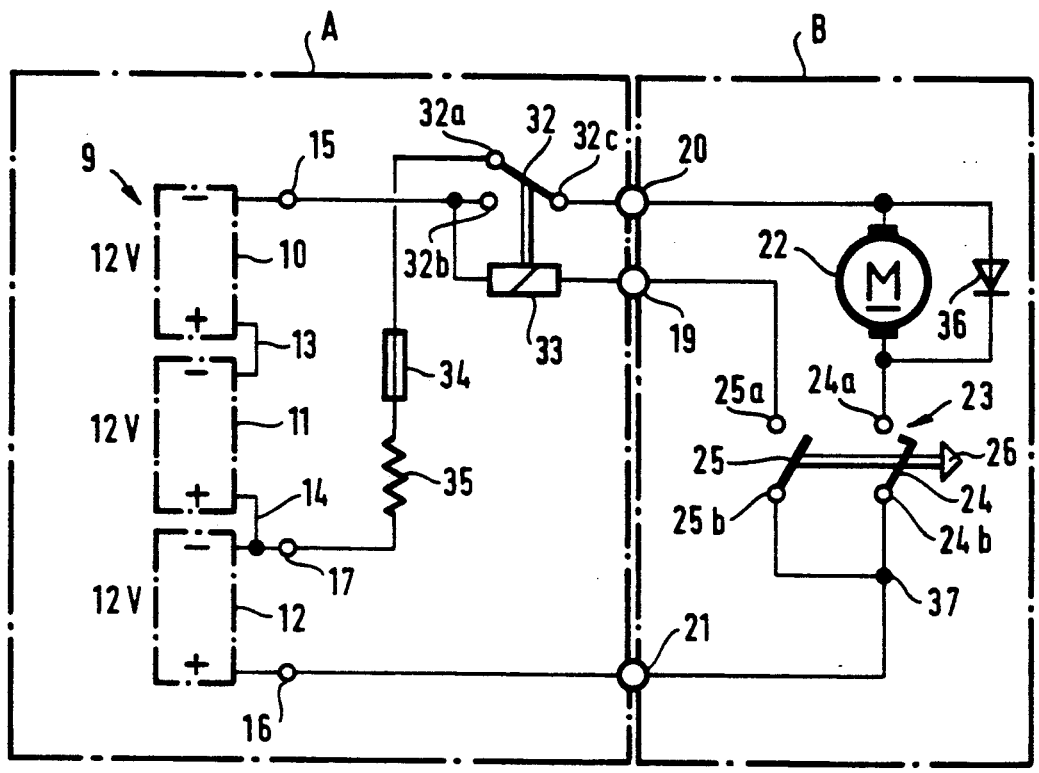
FIG. 5 is a schematic view of a battery operated device embodying the present invention comprising a relay-control changeover switch for preventing short circuiting between the intermediate tap and the end tap of the battery, as well as a motor recovery diode and short circuit resistor.

A further embodiment of the battery operated device, according to the invention, is displayed in FIG. 5. Identical parts are provided with the same reference numerals as in FIGS. 2 to 4.

In FIG. 5, a changeover switch 32, controlled by a relay 33, is located in the circuit between the end tap 15 and the connection plug 20. More precisely, a common contact connection 32c of the changeover switch 32 is connected in this instance via the connection plug 20 with a connection of the DC motor 22 whose other connection is connected with the first contact connection 24a of the first switch 24. A first changeover contact connection 32a of the switch 32 is connected, via a fuse 34 and a resistor 35, with the intermediate tap 17, while a second changeover contact connection 32b of the switch is connected with end tap 15 and, through the relay 33 and the connection plug 19, with a first contact connection 25a of the second switch 25. The second contact connections 24b, 25b are connected with one another and via the connection plug 21, with the battery end tap 16 having positive polarity. Further, a recovery diode 36 is arranged in parallel with the DC motor 22.

The operation of the device in FIG. 5 is described more in detail as follows.

If the trigger 26 is only lightly pressed, then only the first switch is closed initially. The DC motor 22 then receives a lower operating voltage corresponding to the battery voltage between the intermediate tap 17 and the battery end tap 16. Thus, in this embodiment, starting from the battery end tap 16, current flows back to the intermediate tap 17 by way of the connection plug 21, the first switch 24, the DC motor 22, as well as through the contact connections 32c and 32a of the changeover valve 32 and further by way of the fuse 34 and the resistor 35. The DC motor 22 then rotates at a lower speed.

If the trigger 26 is pressed in to the full extent, the second switch 25 is closed, while the first switch remains in the closed state. Due to the closed second switch 25, the full battery voltage between the end taps 15, 16 reaches the relay coil 33 and the relay coil is actuated. As a result, the relay switch 32 changes over so that its contact connections 32b voltage between the end taps 15, 16, so that current flows from the end tap 16, through the connection plug 21, the first switch 24, the DC motor 22 and the changeover switch 32 to the end tap 15. The DC motor now rotates at a higher speed. During the brief current interruption when switching from 32a to 32b, the recovery diode 36 takes over the current flow.

When releasing the trigger 26, the operation of the device takes place in the reverse sequence, with the second switch 25 being opened first and the relay 33 de-actuated. Accordingly, the contact connections 32a and 32c are again bridged in the changeover switch 32, whereby the DC motor 22 first rotates at the lower speed before it is completed switched off when the first switch 24 is opened.

Changeover switch 32 is arranged so that a contact overlapping between the contact connections 32a, 32b never takes place. The recovery diode 36 is polarized in such a way that it ensures an uninterrupted current flow in the DC motor during the continued switching from the contact connection 32a to the contact connection 32b and, at the same time, reinforces a cancellation of arcing between these contact connections. More specifically, the cathode of the diode 36 is connected with the first contact connection 24a of the first switch 24, and the anode of the diode 36 is connected with the connection plug 20. The protective resistor 35 limits a current in case arcing nevertheless remains between the contact connections 32a and 32b. If this current reaches too great a value, the fuse 34 provides for interruption of the circuit.

The changeover switch 32 can also be provided as a electronic switch, that is, by means of transistors or thyristors which are then driven by a driving stage instead of the relay coil when the second switch 25 is closed.

In the embodiment set forth in FIG. 5, the DC motor 22 can be positioned between the connection plug 21 and a junction 37 with the parallel recovery diode 36, the junction 37 being connected with the second contact connections 25b, 24b of the switches 25, 24.

Figure 6:
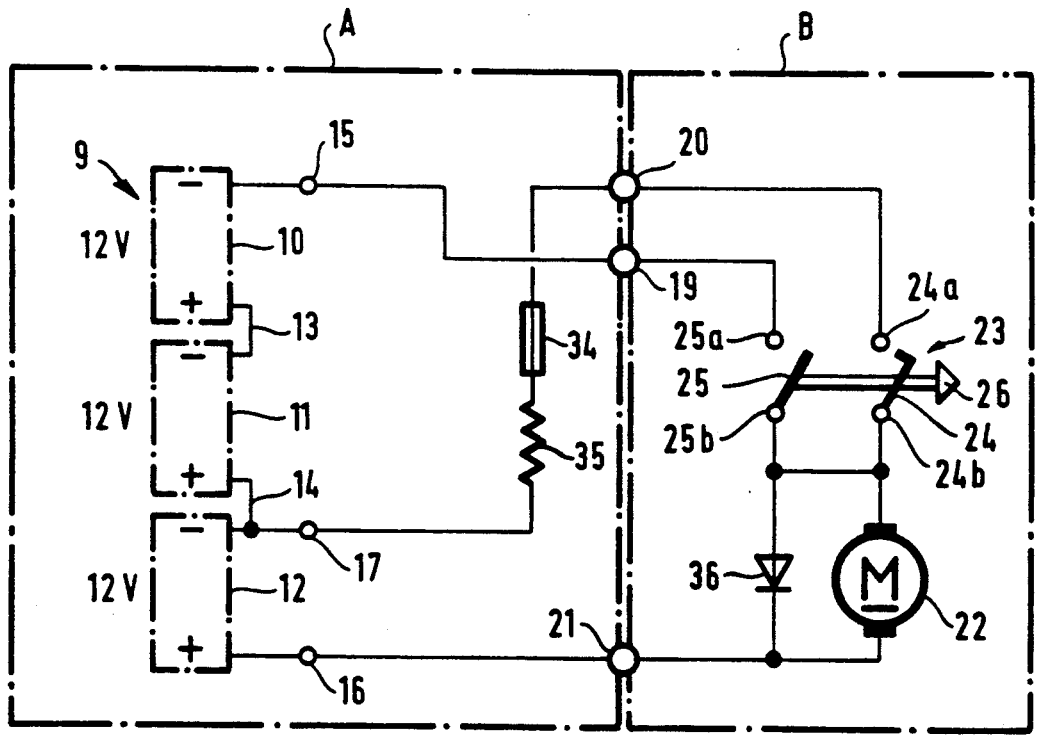
FIG. 6 is a schematic view of a battery operated device, embodying the present invention, comprising a second switch with a step function for delivering full battery voltage to the DC motor which receives the lower battery voltage by way of the first switch, and including a motor recovery diode and short circuit resistor.

Yet another embodiment of a battery operated device, according to the present invention, is illustrated in FIG. 6. In this embodiment, the end tap 15 of the battery 9 is connected with the second contact connection 25a of the second switch 25 by way of the connection plug 19. The intermediate tap 17 is connected with the first contact connection 24a of the first switch 24 via the resistor 35, the fuse 34 and the connection plug 20. The two second contact connections 24b, 25b of the first and second switches 24, 25 are connected with a connection of the DC motor 22 and the other motor connection is connected through the connection plug 21 with the battery end tap 16 which has positive polarity. The recovery diode is again arranged in parallel with the DC motor 22.

If the switch device 2 is initially only lightly pressed inwardly by the trigger 26, the first switch 24 is closed. The DC motor 22 then works at low speed, since only the lower battery voltage is supplied to it. Accordingly, current flows from the battery end tap 16 back to the intermediate tap 17 by way of the connection plug 21, the DC motor 22, the first switch 24, the connection plug 20, the fuse 34 and the resistor 35.

When the trigger is pressed further inwardly, the first switch 24 is opened and then the second switch 25 closes. The closing of the second switch is effected in a sudden manner after the first switch has been securely opened. The first switch 24 has only a wiping contact.

After the second switch 25 closes, the DC motor 22 receives the full battery voltage between the end taps 15, 16 and the thus rotates at a higher speed. Current now flows from the end tap 16 back to the end tap 15 by way of the connection plug 20, the DC motor 22, the second switch 25 and the connection plug 19.

When switching from low to full battery voltage, the recovery diode provides for an uninterrupted current flow to the motor and, moreover, reinforces the cancellation of arcing in the region of the switch device 23. Resistor 35 serves to limit the current in case of a conducting connection between the first contact connections 24a, 25a via the switch device 23 whereby the fuse 34 interrupts the flow in the case of an excessive current flow.

In addition to a suitable speed control without power lapse, the switch-on current in the starting phase can also be reduced with the battery operated device, according to the invention, whereby switches, switching relay and contact connections and battery cells are protected. Further, the risk of irreversible field damage due to switching on the device at low temperatures is reduced.

While specific embodiments of the invention have been shown and described in detail to illustrate the application of the inventive principles, it will be understood that the invention may be embodied otherwise without departing from such principles.

We claim:

1. Battery operated device comprising a DC motor (22), a battery (9) comprising a plurality of cells (10, 11, 12) connected in series, circuit means connecting said battery (9) to said DC motor (22), said circuit means including a switch device (23) for initially supplying a lower battery voltage from an intermediate tap (17) of the battery (9) and then a full battery voltage obtained from a first end tap (15) of the battery (9) are supplied to the DC motor (22) for changing the rate of speed of the motor, wherein the improvement comprises that the switch device (23) is a two-pole switch device (23) including a first switch (24) for transmitting in a closed position the lower battery voltage, and a second switch (25) supplying in a closed position the full battery voltage to the DC motor (22), the first switch (24) is arranged so that it remains in the closed position at least over a long switch path, and the closing of the second switch (25) lags behind the closing of the first switch (24), and means (18; 32, 33) for preventing a short circuit between the intermediate tap (17) and the first end tap (15) of the battery (9) when the second switch (25) is moved into the closed position.

2. Battery operated device, as set forth in claim 1, wherein said means for preventing a short circuit comprises a diode device (18) positioned in the circuit means between the intermediate tap (17) and a first contact connection (24a) of the first switch (24) whereby said first switch, after closing, remains closed along the full switch path.

3. Battery operated device as set forth in claim 2, wherein said DC motor (22) is located in the circuit means between the diode device (18) and the first contact connection (24a) of the first switch (24).

4. Battery operated device, as set forth in claim 3, wherein the circuit means includes a line extending between the diode device (18) and the DC motor (22) and connected to a second contact connection (25b) of said second switch (25), a first contact connection (25a) of said second switch (25) is connected with the first end tap (15) of the battery (9) and the second contact connection (24b) of said first switch (24) is connected with a second end tap (16) of the battery at the opposite end of the battery (9) from said first end tap (15).

5. Battery operated device, as set forth in claim 3, wherein said circuit means comprises a line between a diode device (18) and the DC motor (22) connected with a second contact connection (29b) of a third switch (29) and said third switch (29) has a first contact connection (29a) connected with the first end tap (15) of the battery (9) and, through driving means (3) for closing the third switch (29), with a first contact connection (25a) of the second switch (25), and said second switch (25) has a second contact connection (25b) connected with a second contact connection (24b) of the first switch (24) and a second end tap (16) of said battery (9) is located at the opposite end of said battery from said first end tap (15).

6. Battery operated device, as set forth in claim 2, wherein a second contact connection (24b) of the first switch (24) out of connection with said diode device (18) is connected with a second contact connection (25b) of the second switch (25) and also with the DC motor (22) and a first contact connection (25a) of the second switch (25) is connected with the first end tap (15) of the battery (9).

7. Battery operated device, as set forth in claim 2, wherein a second contact connection (24b) of the first switch (24) out of connection with the diode device (18) is connected with the DC motor (22), and the first contact connection (24a) of the first switch (24) connected with the diode device (18) is also connected with a second contact connection (25b) of the second switch (25), and a first contact connection (25a) of the second switch (25) is connected with the first end tap (15) of the battery (9).

8. Battery operated device, as set forth in claim 2, wherein the line between the diode device (18) and the first contact connection (24a) of the first switch is connected with a second contact connection (29b) of a third switch (29) having a first contact connection (29a) connected with the first end tap (15) of the battery (9) and, through a driving means (30) for closing the switch (29), with a first contact connection (29a) of the second switch (25), and said second switch (25) has a second contact connection (25b) connected with a second contact connection (24b) of the first switch (24) and, through the DC motor (22), with a second end tap (16) of the battery (9) located at the opposite end of said battery from the first end tap (15).

9. Battery operated device, as set forth in claim 2, wherein said diode device (18) is a semiconductor diode.

10. Battery operated device, as set forth in claim 9, wherein a recovery diode (36) is connected in said circuit means and parallel with said DC motor (22).

11. Battery operated device, as set forth in claim 1, wherein said second means comprises a changeover switch (32) having a common third contact connection (32c) connected, through the DC motor (22), with a first contact connection (24a) of the first switch (24), said changeover switch (32) has a first changeover contact connection (32a) connected with the intermediate tap (17) of the battery (9) and a second changeover contact connection (32b) connected with the first end tap (15) of the battery (9) and through driving means (33) for switching over the changeover switch (32) between the first and second contact connections (32a, 32b) with a first contact connection (25a) of the second switch (25) and a second contact connection (25b) connected with a second contact connection (24b) of the first switch (24) and with a second end tap (16) of the battery (9) located at the opposite end thereof from the first end tap (15), wherein the first switch (24), after closing, remains closed along an entire switch path thereof.

12. Battery operated device, as set forth in claim 11, wherein the DC motor lies in a line of said circuit means extending between the second end tap (16) and the interconnected second contact connections (24b, 25b) of said first and second switches (24, 25).

13. Battery operated device, as set forth in claim 11, wherein the third switch (29) and the changeover switch (32) are relay-controlled switches and the driving means (30, 33) is a relay coil.

14. Battery operated device, as set forth in claim 11, wherein the third switch (29) and the changeover switch (32) are electronic switching elements and the driving means is arranged for driving the electronic switching elements.

15. Battery operated device, as set forth in claim 14, wherein the electronic switching elements are one of transistors and thyristors.

16. Battery operated device, as set forth in claim 1, wherein said short circuit prevention means (18; 32, 33) initially closes the second switch (25) suddenly when the first switch (24d) has been opened, and the first end tap (15) of the battery (9) is connected with a first contact connection (25a) of said second switch (25), the intermediate tap (17) of the battery (9) is connected with a first contact connection (24a) of the first switch (24) and second contact connections (24b, 25b) of the first and second switches (24, 25) are connected with one another, and through the DC motor (22), with a second end tap (16) of the battery (9) located at the opposite end of the battery from the first end tap (15).

17. Battery operated device, as set forth in claims 11, 12, or 16, wherein a resistor (35) is arranged in the circuit means between the intermediate tap (17) and the first changeover contact connection (32a) of the changeover switch (32).

18. Battery operated device, as set forth in claim 17, wherein a fuse (34) is located in said circuit means and in series with said resistor (35).

19. Battery operated device, according to claims 11, 12, or 16, wherein a resistor (35) is located in the circuit means between said intermediate tap (17) and the first contact connection (24a) of the first switch (24).

20. Battery operated device, according to claim 19, wherein a fuse (34) is located in said circuit means in series with said resistor (35).

21. Battery operated device, as set forth in claim 1, wherein an operating part (B) contains at least said DC motor (22) and the switch device (23), and a supply part (A) including at least the battery (9), and said operating part (B) and supply part (A) are electrically connected together.

22. Battery operated device, as set forth in claim 21, wherein the operating part (B) is a drilling machine.

* * * * *